Patented Nov. 8, 1932

1,886,903

UNITED STATES PATENT OFFICE

OLIVER C. RALSTON AND CHARLES R. KUZELL, OF CLARKDALE, ARIZONA, ASSIGNORS TO UNITED VERDE COPPER COMPANY, OF CLARKDALE, ARIZONA, A CORPORATION OF DELAWARE

TREATMENT OF MATTE

No Drawing.　　　Application filed September 25, 1929. Serial No. 395,182.

This invention relates to the treatment of matte obtained during the smelting of ores containing sulfides of copper and iron and has for an object the provision of an improved process for making copper matte reactive toward dilute acids. More particularly, the invention contemplates the provision of a novel process for manufacturing hydrogen sulfide. The invention further contemplates the provision of an improved process for concentrating copper matte.

Hydrogen sulfide is usually prepared by the interaction of dilute mineral acids such as sulfuric acid and hydrochloric acid with iron sulfide contained in iron mattes.

Copper mattes contain considerable quantities of iron sulfide, but the usual composition is such that the mattes are quite inert and unreactive toward dilute acids. They are even slow to react with strong acids and on that account the usual practice in copper smelters when taking samples of matte for analysis is to quench them in water whereby supposedly the quench thoroughly shatters their structure permitting better access of acid. The usual copper matte is made under oxidizing conditions in a reverberatory furnace and contains dissolved magnetite and ferrous oxide part of which crystallizes during cooling of the matte. Even copper blast furnace mattes made in blast furnaces to whose charges certain amounts of coke have been added are somewhat oxidized and usually contain iron oxides such as magnetite and ferrous oxide. Very rarely can a sample of either reverberatory or blast furnace matte be found which will react with dilute acids with sufficient rapidity to permit its use in generating hydrogen sulfide for industrial purposes.

Our investigations indicate that in general there are three classes of copper mattes with respect to their reactive characteristics.

The first class which is by far the largest consists of totally unreactive mattes.

The second class comprises unreactive mattes which are characterized in their action toward acid by a period of inhibition or delay after application of the acid, during which no reaction takes place, followed by a period during which the reaction proceeds rapidly.

The third class includes rare cases in which the mattes are reactive as formed.

The present invention contemplates the provision of a process by means of which the iron sulfides contained in unreactive copper mattes may be utilized for the production of hydrogen sulfide, and by means of which a large proportion of the contaminants contained in copper mattes may be removed with a resulting concentration of the copper and a saving in the cost of extracting metallic copper.

We have discovered that unreactive copper matte can be converted into reactive copper matte through the incorporation therein of metallic iron. As a result of our investigations, we have found that copper mattes containing from two to twelve per cent of free metallic iron are reactive toward mineral acid solutions, such for example, as sulfuric acid solutions containing from ten to twenty-five per cent $H_2SO_4$. Matte containing free iron in amounts less than two per cent is slowly reactive, while mattes containing more than twelve per cent of free iron are hardly more reactive than those containing from two to twelve per cent of free iron.

According to the process of our invention, free metallic iron may be incorporated in the matte by adding metallic iron, as such, to a quantity of matte, or by subjecting the matte to a reducing operation to reduce one or more of the iron compounds contained therein and produce free metallic iron.

In a copper smelter at which a plentiful supply of scrap iron is available, the preferred method of preparing reactive matte is to add scrap iron to the charge, or, in case a reverberatory furnace is in use, to add the scrap in the settling bay just before tapping matte. Scrap iron may also be introduced into the transfer ladles just before matte is tapped into them.

When scrap iron is not available, or when for any reason it is not advisable to add metallic iron as such to the matte, the necessary metallic iron can be incorporated by heating the matte in the presence of a reducing agent. Thus, molten matte may be slowly poured down a column of glowing coke such as that contained in a cupola, or solid, liquid or gaseous reducing agents, such, for example, as coal, coke, hydrogen, carbon monoxide, producer gas, oil, and oil gas, may be injected into a molten bath of matte.

In general, it may be considered that the reducing agent functions to reduce the magnetite and other iron oxides contained in the matte or in ferrous silicate slags associated with the matte. It is not essential that all of the oxides of iron be reduced.

In the case of mattes characterized by a period of inhibition of reaction, we have found that the addition of small amounts of finely divided solid metallic iron to finely divided solid mattes produces reactive mixtures.

In manufacturing hydrogen sulfide from copper matte, the desired amount of iron is incorporated in the matte, and, in the event that the mixture of matte and iron is molten, the molten bath is chilled and solidified. The solidified matte is crushed and ground to a particle size which permits intimate contact of the matte and an acid solution. Acid of suitable strength and type is added to the comminuted material at atmospheric temperature, and, when the proper amount of iron is present, hydrogen sulfide gas is evolved rapidly. The hydrogen sulfide gas may be collected and utilized in any known manner. The iron sulfide will be replaced by a water soluble iron compound which may be readily separated from the remaining components of the matte.

The exact constituents of a frozen copper matte are not known, but there seem to be present in different mattes at least the following constituents: metallic copper, cuprous sulfide, a double copper-iron sulfide of variable composition, ferrous sulfide, ferrous oxide, magnetite and metallic iron. Not all of these constituents are in any one sample of matte as their simultaneous existence is frequently impossible. In the treatment of complex ores, sulfides of zinc and lead may also be present in the mattes.

The reaction probably proceeds as follows when sulfuric acid is used:

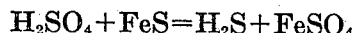
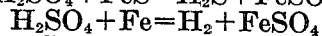

$$H_2SO_4 + FeS = H_2S + FeSO_4$$
$$H_2SO_4 + Fe = H_2 + FeSO_4$$
$$CuS + H_2 = Cu + H_2S$$

The ferrous sulfate produced will remain in solution if a sufficiently dilute acid has been used and it may be separated from the solid residue by decantation. Any crystallized ferrous sulfate may be removed by washing the residue with water. The conversion of iron sulfide to a water-soluble iron compound and the removal of the soluble compound results in the production of a residue in which the copper is highly concentrated. At least a portion of the copper sulfide is also reduced with a resultant additional concentration of the copper. The solid residue will consist largely of elemental copper, cupric sulfide, and cuprous sulfide.

The reaction between the acid and the sulfides of the matte may be carried on to any desired extent. If the matte is made reactive and treated with acid primarily for the purpose of producing hydrogen sulfide, it might be desirable to carry on the acid treatment until only a small portion of the sulfides are dissolved. In such cases mattes containing relatively small amounts of free iron may be used. On the other hand, if the matte is made reactive and treated with acid for the purpose of concentrating the copper or for the purpose of concentrating the copper and obtaining hydrogen sulfide, it is advisable to carry on the acid treatment until a large proportion or even all of the sulfides have been dissolved. In such cases it is advisable to utilize mattes containing relatively large amounts of free metallic iron. The amount of copper sulfide reduced depends largely upon the amount of free iron present. The iron should be present in amounts in excess of the theoretical amounts required for the reduction of the copper sulfides as the reaction, in its commercial application, is not entirely efficient.

We claim:—

1. The method of forming reactive matte which comprises incorporating free iron in copper matte.

2. The method of forming reactive matte which comprises incorporating free iron in copper matte to produce a mixture containing at least two per cent by weight of free metallic iron.

3. The method of forming reactive matte which comprises subjecting molten copper matte to the action of a reducing agent to reduce iron compounds contained therein and produce free metallic iron.

4. The method of forming reactive matte which comprises subjecting molten copper matte to the action of a reducing agent to reduce iron compounds contained therein and form a product containing at least two per cent by weight of free metallic iron.

5. As a new product, a reactive copper matte containing from two to twelve per cent by weight of free metallic iron.

6. As a new product, a mixture consisting of the normal components of copper matte and at least two per cent by weight of free metallic iron.

7. The method of concentrating copper matte which comprises incorporating free metallic iron in the matte, and treating the resulting mixture with a mineral acid to dissolve iron sulfide and reduce copper sulfide.

8. The method of producing hydrogen sulphide which comprises smelting ore containing sulphides of copper and iron to produce matte, incorporating metallic iron in the matte, and treating the resulting product with a mineral acid.

9. The method of producing hydrogen sulphide which comprises mixing finely divided copper matte and finely divided metallic iron, and subjecting the mixture to the action of a mineral acid.

10. The method of producing hydrogen sulphide which comprises smelting ore containing sulphides of copper and iron to produce a molten bath of matte, subjecting the molten matte to the action of a reducing agent to reduce one or more iron compounds contained therein and produce metallic iron, and subjecting the resulting product to the action of a mineral acid.

11. The method of producing hydrogen sulphide which comprises smelting ore containing sulphides of copper and iron to produce molten matte, mixing metallic iron with the molten matte, and subjecting the resulting product to the action of a mineral acid.

12. The method of producing hydrogen sulphide which comprises subjecting ore containing sulphides of iron and copper to the action of heat and a reducing agent to form a molten matte product containing at least two percent by weight of metallic iron, and subjecting the resulting product to the action of an acid.

In testimony whereof we affix our signatures.

OLIVER C. RALSTON.
CHARLES R. KUZELL.